United States Patent [19]

Wijntjes et al.

[11] Patent Number: 4,655,587
[45] Date of Patent: Apr. 7, 1987

[54] MIRROR SCAN VELOCITY CONTROL

[75] Inventors: Geert Wijntjes, Belmont; Michael Hercher, Marblehead, both of Mass.

[73] Assignee: Beckman Instruments, Inc., Fullerton, Calif.

[21] Appl. No.: 781,185

[22] Filed: Sep. 25, 1985

Related U.S. Application Data

[63] Continuation of Ser. No. 472,539, Mar. 5, 1983, abandoned.

[51] Int. Cl.$^4$ ............ G01J 3/45; G01B 9/02
[52] U.S. Cl. ................ 356/346; 318/640; 356/28.5
[58] Field of Search .......... 356/28.5, 346, 389; 318/640

[56] References Cited

U.S. PATENT DOCUMENTS 4,193,693 3/1980 Schindler ............... 356/346
4,413,908 11/1983 Abrams et al. ........... 356/346

FOREIGN PATENT DOCUMENTS 2032098 4/1980 United Kingdom ........... 356/349

OTHER PUBLICATIONS

Thompson et al., "A Motor-Micrometer-Driven Infrared Fourier-Transform Spectrometer", *Pubs. Astronom. Soc. Pac.*, vol. 87, No. 520, pp. 929–932, 12/75.
Yoshimura et al., "Optical Frequency Shifting for Rayleigh Scattering Spectroscopy", *J. Phys. E.: Sci. Instrum.*, vol. 11, No. 8, pp. 777–780, 8/78.

*Primary Examiner*—Davis L. Willis
*Assistant Examiner*—Matthew W. Koren
*Attorney, Agent, or Firm*—William H. May; Paul R. Harder; Steven R. Markl

[57] ABSTRACT

An improved mirror scan control for driving a movable mirror in an interferometer with a constant scan velocity comprises a closed loop servo control which provides constant velocity mirror scan in response to a phase comparison of a signal derived from the beat frequency of a two frequency laser beam passing through the interferometer and a selected frequency reference signal, wherein the difference in frequencies or beat frequency of the two frequency laser beam is stabilized at a specified difference in frequencies. The mirror scan control employs a phase lock control loop which locks the frequency of the referenced signal with the frequency of the signal derived from the laser beam to provide precise mirror velocity control.

16 Claims, 3 Drawing Figures

MIRROR SCAN VELOCITY CONTROL

This is a continuation of application Ser. No. 472,539, filed Mar. 5, 1983, now abandoned.

FIELD OF THE INVENTION

The present invention pertains to spectrophotometric instruments, utilizing light of selected wavelengths to measure spectral absorbance characteristics of a sample material and in particular to infrared spectrophotometers utilizing a interferometer and a laser to obtain spectral data of a sample.

BACKGROUND OF THE INVENTION

A modern Fourier Transform Infrared FT-IR spectrophotometer consists of two basic parts: (1) an optical system which includes an interferometer through which an infrared light beam is directed before passing the beam through a sample and (2) a dedicated computer which is used to control the spectrophotometer and analyze spectral information contained in the light beam produced. The advantages and improved performance of a FT-IR spectrophotometer result from the use of an interferometer, rather than a grating or prism to obtain variance in the intensity as a function of wavelength in the infrared beam applied to the sample in generating spectral data indicating the sample com position. An interferometer permits measurement of the entire spectral profile of a sample in a fraction of the time previously required while increasing the amount of information obtained.

The operation of a Michelson interferometer as applied to FT-IR spectrophotometry is well known. The Michelson interferometer consists of a pair of perpendicularly arranged optical paths, each having a reflector or mirror positioned at its end to reflect light traversing the path. One mirror is fixed to define a first fixed length light path. The other mirror is movable to increase or decrease the length of the second light path. A light beam entering the interferometer is optically split into two beam portions by a beam splitter so that an individual portion of the beam will traverse each of the optical paths. After reflection from their respective mirrors the beam portions are recombined through the beam splitter to constructively and destructively interfere causing interference phenomenon in this reconstructed light beam. This produces an intensity modulation of the light beam. The reconstructed light beam is thereafter directed through a sample and focused onto a photodetector for measurement of intensity and intensity variance of the light wavelengths comprising the infrared light beam.

The intensity variation of the light wavelengths comprising the reconstructed light beam depends in part on the difference in length of the optical paths over which the portions of the beam travel. Generally, when the movable mirror is scanned at a constant velocity, the intensity of the reconstructed light beam will modulate in a regular sinusoidal manner for any selected wavelength of light within the infrared light wavelength ranged passing through the interferometer.

A typical infrared light beam emerging from the interferometer is a complex mixture of frequencies (light wavelengths) due to the polychromatic nature of the entering infrared light. After the infrared light beam has passed through a sample material, it can be photometrically detected to determine wavelengths of light which have been absorbed by the sample. This is accomplished by measuring change in the regular sinusoidal pattern of intensity variation expected in the light beam exiting the interferometer. Measurement of the differences in the characteristic sinusoidal intensity pattern indicates those wavelengths of light which are absorbed by the sample through Fourier Transform analysis. Infrared light absorbance characteristics provide spectral data from which the matter comprising the sample can be determined.

The output signal of a detector detecting the intensity modulation of the emerging light beam can be recorded at very precise intervals during mirror scan of the interferometer, to produce a graphical plot known as an interferogram. The interferogram is a record of the output signal produced by the light detector (beam intensity) as a function of the differing length optical paths traversed by the infrared beam in the interferometer. Successive interferograms of the sample are obtained and co-added to obtain an average interferogram having improved signal-to-noise characteristics to aid sample analysis. The averaged interferogram provides information and data relating to the spectral characteristics of the sample material. After mathematical preparation, a Fourier transform calculation is performed on the interferogram data to obtain a spectral fingerprint of the sample composition. The results are compared against known reference data to determine the composition of the sample.

Most Fourier transform techniques require averaging of a large number of interferograms in order to obtain accurate results. As many as 50 interferograms may be averaged. It is important for interferograms to be precisely reproducible for their accurate averaging. Since an interferogram is created as a function of the movable mirror position, more accuracy in the interferogram (and in the resultant Fourier transformation) will be obtained if more accuracy is obtained in the determination of mirror position when the data are measured which define the interferogram.

Since the movable mirror in the interferometer is scanned while measurements of the light beam are taken, to accomplish accuracy in and reproducibility of an interferogram, both the rate of data measurement and mirror velocity must be very precisely controlled. Alternatively, the relative position of the mirror may be measured when a data measurement is taken. Modern systems accomplish sampling rate and mirror velocity control (and/or mirror position measurement) by passing a laser beam concurrently through the interferometer with the infrared light. The laser beam is used to directly measure the movement and/or position of the movable mirror. Since the laser beam traverses the same change in optical path as the infrared light beam, the laser beam provides a detectable monochromatic wavelength with an interference pattern containing information of the scan velocity of the movable mirror. The interference pattern also serves to indicate the position of the mirror during a scan, and to initiate and correlate the collection of data points at uniform and equal intervals of mirror displacement.

In a conventional system, when the movable mirror is moving at a constant velocity, a Doppler shift in frequency is generated in the portion of the laser beam traversing the second light path which is changing in length. When the laser beam portion exhibiting a Doppler shift in frequency is recombined with the laser beam portion traversing the first fixed length light path, a modulated frequency laser beam exhibiting a measurable intensity modulation having a distinct lower frequency (beat frequency) is produced, yielding varying intensity or fringe patterns which may be analyzed to determine mirror position and/or velocity. The frequency of the beat is useful because the frequency of the laser beam is much too high for measurement by common detectors.

Conventional systems generally drive the moving mirror of the second light path at a velocity which produces a 5 KHz intensity modulation or beat frequency in the exiting laser beam. This beat frequency is equal to the magnitude of the Doppler shift in frequency because it equals the difference in frequency between the recombined light beam portions. At increased mirror scan velocities, the beat frequency will increase providing increased resolution while at slower mirror scan velocities the modulation frequency will decrease. Precision with this technique can be maintained to approximately one cycle in 5,000 to provide very accurate position and velocity information.

In a conventional system, however, a movable mirror must be in motion to obtain a Doppler shift in frequency in the light beam traversing the second light path, and thus a measurable beat frequency. To explain, when the movable mirror is stationary, the portions of the laser beam traveling along their individual light paths of the interferometer are recombined to constructively or destructively interfere, but form an identical frequency laser beam without modulation since no Doppler shift in frequency has been introduced in either portion of the laser beam. The emerging recombined beam exhibits no intensity modulation and no beat. Thus when the mirror is not moving, there is no information obtainable from the recombined laser beam which can be used to determine mirror position or mirror velocity. In operation this occurs at every instance that the movable mirror reaches the end of its scan and stops to proceed in the other direction.

Furthermore, in a conventional interferometer system the Doppler shift in frequency generated by a scanning mirror produces the same intensity modulation effect in the recombined laser beam independent of the direction of mirror travel. For instance, a 5 KHz beat frequency may be obtained for travel of the mirror in either a forward or reverse direction. Thus, it is impossible to determine the direction of mirror travel from the emerging recombined laser beam, even though the difference in length of the optical paths may be increasing or decreasing. This shortcoming generally requires additional circuitry to obtain an indication of the direction of mirror travel so that the exact position of the mirror may be determined at any given time.

Lastly, with conventional systems modulation in the recombined laser beam becomes very difficult to measure as the scan velocity of the mirror becomes very slow. For instance, for a 0.3 centimeter per second scan velocity, a beat frequency of 5 KHz is obtained in the recombined laser beam. However, if the mirror is driven at a scan velocity of 0.03 centimeters per second, the beat frequency is reduced to 0.5 KHz. Thus, as the scan velocity is decreased, the beat frequency in the recombined laser beam is decreased to a level which is difficult to measure with modern electronic detectors, providing less accuracy in and resolution of mirror control.

An FT-IR spectrophotometer has limited resolution in sample identification determined by its ability to produce and reproduce, an interferogram. The only moving part fundamental to the optical system is the movable mirror of the interferometer. This part largely determines the accuracy with which a spectrophotometer can generate interferograms. The accuracy with which the spectrophotometer can analyze a sample is directly related to the accuracy and reproducibility of the interferogram and thus the ability of the instrument to control and determine the velocity and position of the movable mirror.

The conventional use of a laser reference to control and determine the velocity and position of the movable mirror continues to suffer limited precision and control ability. Improvements in the precision with which mirror position can be measured and mirror velocity controlled will necessarily produce significant improvement in the accuracy with which an FT-IR spectrophotometer can analyze a sample substance.

SUMMARY OF THE INVENTION

The present invention comprises an improved mirror scan control for driving a movable mirror of an interferometer in a Fourier Transform Infrared (FT-IR) spectrophotometer at a constant scan velocity, and for permitting more accurate determination of the position of the movable mirror throughout the scan range. In a FT-IR spectrophotometer utilizing a laser which generates a laser beam having two component frequency or modal components, a standard Michelson interferometer and a reference signal source, a novel closed loop electronic servo control provides control of mirror scan velocity through a comparison of a signal derived from the laser beam passing through the interferometer and a controlled frequency reference signal. The laser is stabilized by a second closed loop electronic servo control which maintains the frequency difference between the two differing frequency components of the laser beam at a constant value. The mirror scan servo control in cooperation with the laser servo control employs phase-lock control techniques in which a detected signal indicative of functional parameters of the movable mirror is locked to a common reference signal. The mirror scan servo control accomplishes precise and stable mirror control through analysis of intensity modulation in the heterodyned components of the laser beam.

A laser beam having two frequency components of slightly differing frequency is obtained by applying a magnetic field to an helium-neon gas laser. This phenomenon is well known and described as the Zeeman-splitting effect. The difference in frequencies between the components of the laser beam is stabilized at a selected difference by the laser servo control. This causes a continuous and constant frequency intensity variation of (beat signal in) the laser beam due to the heterodyne mixing of the differing frequency components. Stabilization is accomplished by locking the phase of the signal generated from intensity detection of the laser beam which exhibits the characteristic beat signal to a first reference signal generated by the reference signal source having a frequency equal to the selected frequency difference desired between the components of the laser beam.

The laser beam, having differing frequency components selectively separated, is directed through the interferometer. Each of the frequency components of the laser beam is combined with its other frequency component after traversing their respective optical paths in the interferometer, through known optical polarization techniques. The recombined laser beam exhibits a continual intensity modulation or beat signal having a frequency equal to the frequency difference of the components, plus or minus a Doppler affected change in frequency caused by the scanning of the movable mirror. The continually displayed modulation (beat signal) of the recombined laser beam provides continuous information from which a signal may be generated indicating scan velocity and position of the movable mirror in the interferometer.

The reference signal source generates a second reference signal having a frequency which is an adaptation of the first reference signal frequency applied to the laser servo control. The second reference signal is increased or decreased in frequency by a value corresponding to a calculated Doppler affected change in frequency caused when the movable mirror is scanned at a selected constant velocity. The second reference signal is applied to the mirror scan control and compared in phase with the intensity variation (beat frequency) of the laser beam leaving the interferometer, to generate a control signal for governing constant scan velocity of the movable mirror. The scan velocity of the movable mirror is corrected through the control signal until a phase lock is obtained between the second reference signal and the signal generated from intensity detection of the recombined laser beam exiting the interferometer which exhibits the beat signal characterized by the Doppler effected change in frequency. A phase lock between these signals maintains a constant velocity scan of the movable mirror, while making available a reference signal known to have information corresponding to mirror scan velocity and mirror displacement.

A direction control is also provided to instruct the reference signal source when to incrementally adjust the second reference signal upwardly or downwardly in frequency from a base frequency. Adjustment of the second reference signal upwardly or downwardly in frequency determines the direction, in addition to the velocity, in which the movable mirror will be driven by the mirror scan servo control. With the movable mirror at a standstill, a beat frequency equal to the frequency difference between the frequency components of the laser beam will be exhibited in the exiting recombined laser beam. A scan of the movable mirror in one direction will generate an increase in the beat frequency due to the Doppler effected frequency change, while a scan of the movable mirror in the other direction will generate a decrease in the beat frequency due to the same Doppler effect. Therefore, by adjusting the second reference signal upwardly or downwardly in frequency a select increment from the standstill beat frequency found in the recombined laser beam (and the generated heterodyne signal therefrom), the movable mirror can be directed to scan in a forward or rearward direction. Through use of a two-frequency Zeeman-split laser which yields a continually modulated laser beam, the direction of mirror scan can be easily determined and directed by an upward or downward frequency shift in the reference signal frequency characterizing the laser beam, throughout the range of mirror movement.

The mirror scan control can provide a constant velocity mirror scan in either direction along the entire range of mirror movement. This is accomplished by phase-lock control using a constant frequency reference signal for each direction of mirror movement. This permits samples to be accurately measured during both forward and backward scans of the movable mirror, substantially reducing the time required to obtain sufficient data for accurate interferogram averaging and analysis techniques.

Furthermore, accurate determination of the position of the mirror can be made during either forward or rearward scans of the mirror by phase shift counting techniques which are known. As the movable mirror is scanned, the number of cycles through which the phasing of the signal representing the recombined laser beam advances or retards relative to that of the reference signal provides a measure of the distal position of the movable mirror within the scan range. Thus by summing the number of cycles shifted between the compared signals, the exact position and change of position of the movable mirror within its scan range, and the difference in length of the optical paths in the interferometer can be easily determined for every sample scan during which data are measured.

The improved mirror scan control overcomes the deficiencies in prior art systems by providing continuous and precise means for determing the position of the movable mirror, and means for controlling mirror scan velocity. The scan control eliminates the need for a separate optical system to re-establish position of the movable mirror after each scan reversal. The increased resolution in obtaining interferogram data using this mirror scan control yields more accurate analysis of the sample material by the FT-IR spectrophotometer. Due to the continuous information signal provided by the two frequency laser and the highly accurate means for position control, it is only necessary to calibrate the spectrophotometer one time for each scan series, thus reducing the complexity and amounts of necessary data to obtain an accurate Fourier transformation and sample analysis.

BEST MODE OF THE INVENTION

Figure 1:
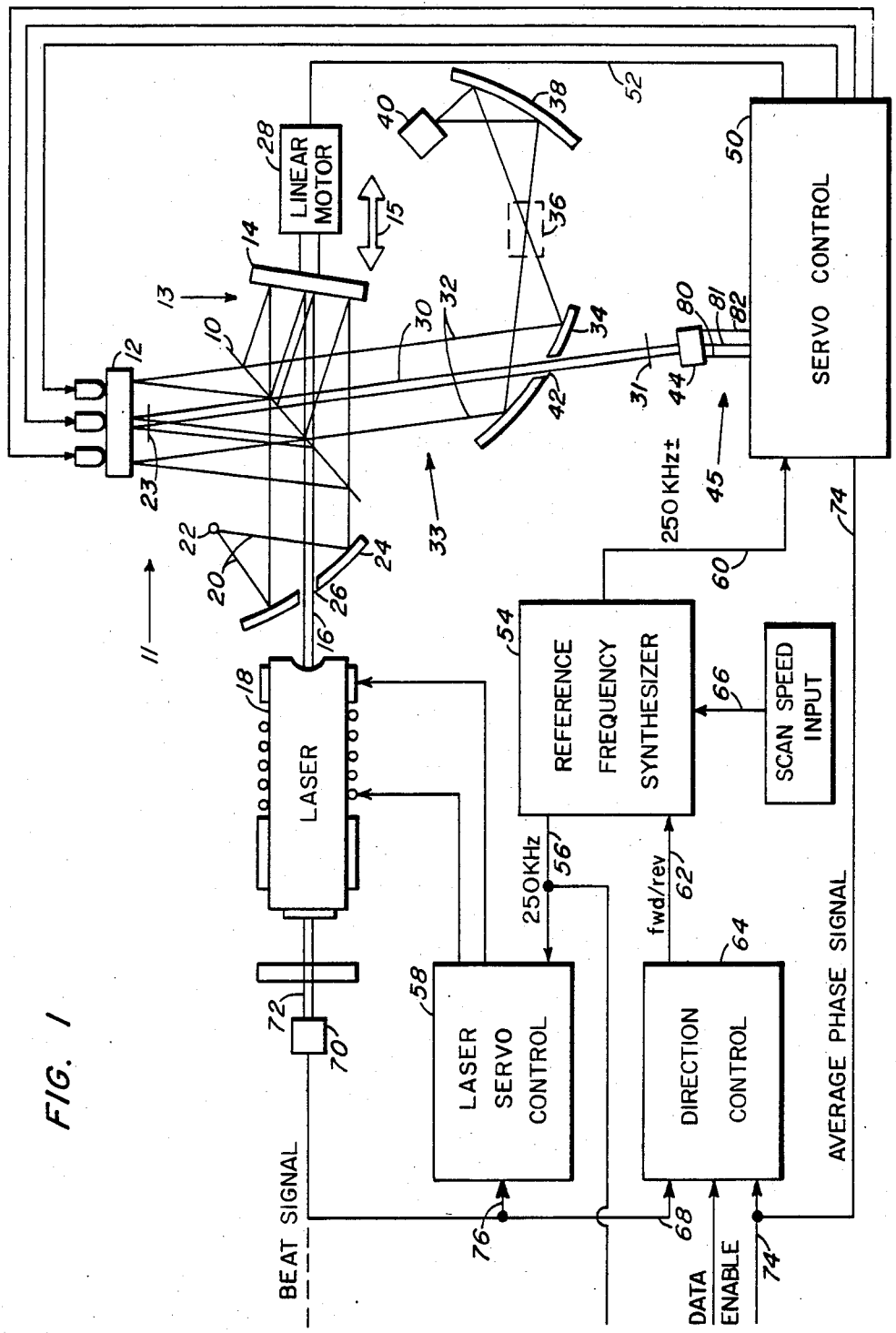
FIG. 1 is a schematic drawing of an interferometric portion of a Fourier Transform infrared spectrophotometer and in particular of the Mirror Scan Control which comprises the present invention.

The interferometer portion of a Fourier transform infrared (FT-IR) spectrophotometer is described with reference to FIG. 1. A Michelson interferometer is depicted which comprises a beam splitter 10 positioned to distribute portions of an incident light beam along each of two perpendicular optical paths 11 and 13. The beam splitter 10 receives a laser beam 16 from a magnetically influenced laser 18, and an infrared light beam, whose boundary is indicated by lines 20, generated by an infrared light source 22. Generally, the infrared beam 20 is reflected and collimated by a non-planar mirror 24 for entry into the interferometer, while the laser beam 16 is directly applied to the beam splitter 10 through an opening 26 centrally located in the non-planar mirror 24.

The beam splitter 10 reflects a first portion of each light beams 16 and 20, along a fixed length optical path 11, which is bounded by a mirror 12. The portions of light beams 16 and 20 are reflected by the mirror 12 to return along the optical path 11 to the beam splitter 10. A second portion of each of the light beams 16 and 20 is passed through the beam splitter 10 along the second optical path 13 which is bounded by a movable mirror 14. The movable mirror 14 is longitudinally movable with respect to the optical path 13, to change the length of the optical path within the selected scan range, indicated by arrow 15. The movable mirror 14 is driven by a mirror scan control 50 directing a linear motor 28. The motor 28 is a commercially available element manufactured by Systems Magnetic Co. and available under Part No. ES-11269.

The second portions of each of the light beams 16 and 20 are reflected from the movable mirror 14 to return along optical path 13 to the beam splitter 10, where they are recombined with the first portions of the light beams 16 and 20 returning along the first optical path 11. The recombination of the first and second portions of the laser beam 16 form a recombined laser beam 30. The laser beam 30 contains information of the velocity and position of the movable mirror 14 through an intensity modulation caused by interference phenomena from the differing frequencies of the first and second frequency or modal components of the laser beam. The recombined portions of infrared beams 20 form a heterodyned beam 32 in which intensity is modulated at a characteristic rate to provide a wavelength range of infrared light which can be applied to the sample material for analysis.

The recombined laser and infrared beams, 30 and 32, respectively, are directed along an exit path 33 of the interferometer in which a reflector 34, similar to reflector 24, is positioned. The reflector 34 receives the collimated infrared beam 32 and reflects and focuses the beam 32 on a sample chamber 36. The infrared beam 32 passes through the sample chamber 36 to a third mirror 38 and reflects from mirror 38 to focus on an infrared photodetector 40. The photodetector 40 receives the intensity modulated infrared beam 32 which has been modified by the absorption of the sample material through which it passes. The modulation in the light beam is detected to produce an electrical information signal proportional to the modified modulation of the beam which is used to generate an interferogram.

The recombined laser beam 30 passes from the interferometer through an opening 42 in the mirror 34. Laser beam 30 is directed to a detector 44. Electrical signal 45 produced by detector 44 is used to obtain a measure of the intensity modulation, i.e. the frequency of a beat phenomenon or beat frequency, which the beam 30 exhibits. The detector 44 may simply comprise a single photodetector centrally positioned in the recombined laser beam 30 to detect intensity modulation therein.

The signal 45 is applied to the mirror scan control 50 to generate a mirror scan drive signal 52. The scan drive signal 52 is applied to the linear motor 28 to control the velocity and direction of movement of the movable mirror 14.

Figure 2:
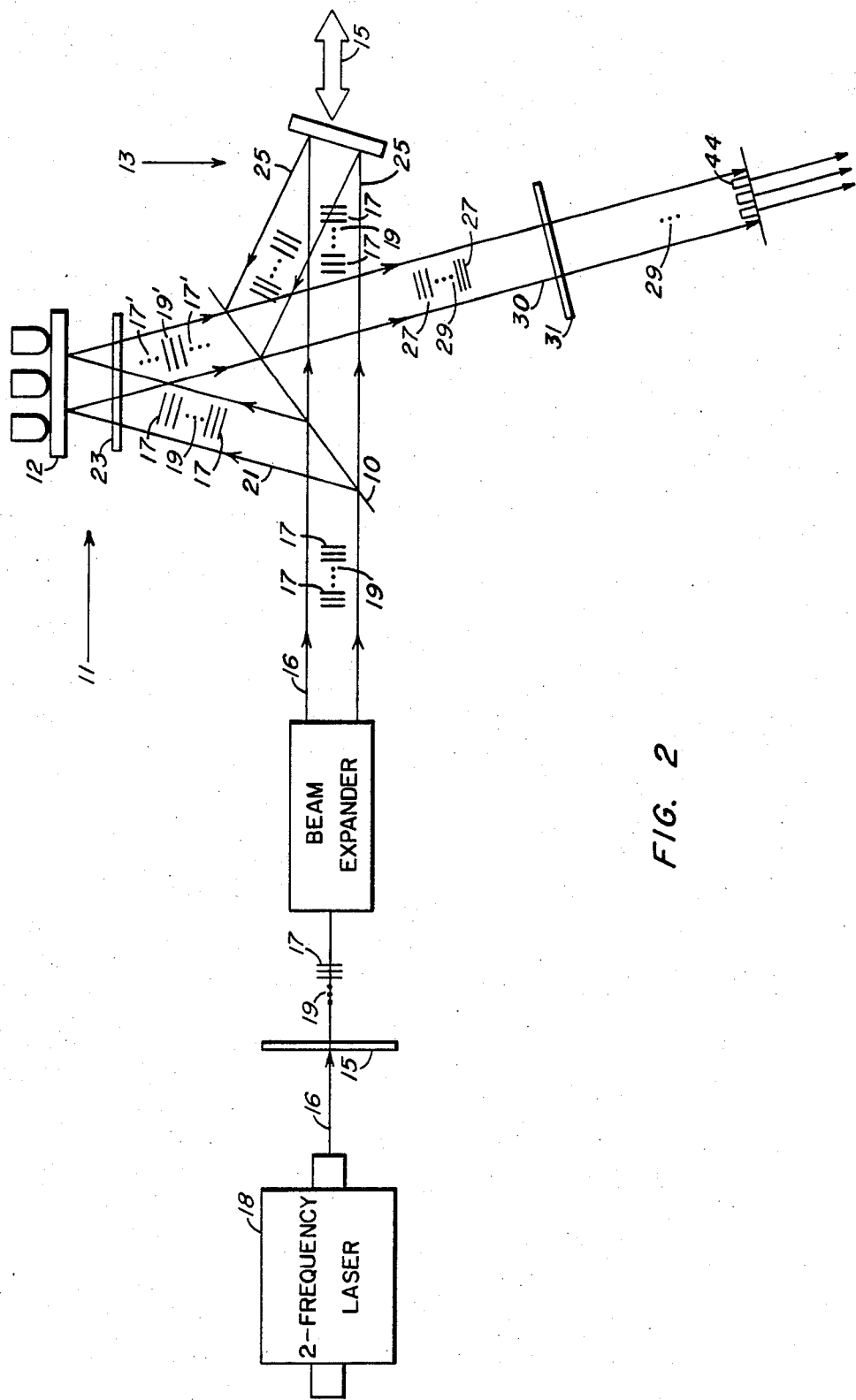
FIG. 2 is a schematic representation of the interferometric portion of the spectrophotometer depicting the polarization relationship of the individual frequency modal components of the two-frequency laser beam as the beam passes through the interferometer.

·The He-Ne laser 10 is magnetically influenced to produce a laser beam 10 with two differing frequency or modal components separated by a measurable frequency difference, each having opposing circular polarization. The differing frequencies and polarizations are used to obtain a continuous information signal in the heterodyne beam 30 entering and leaving the interferometer. Referring to FIG. 2, the laser beam 16 having two modal component frequencies is passed through a quarter waveplate 15 before entering the interferometer. The quarter waveplate 15 converts each of the circularly polarized modal components into a linearly polarized component. For illustration, one linearly polarized component exists in a plane parallel with the drawing, as shown by the bars 17, and has a frequency $f_1$. The other linearly polarized component exists in a plane perpendicular to the drawing, as shown by the dots 19, and has a frequency $f_2$. This phenomena results from linear polarization of the respective circularly polarized model components of the Zeeman-split laser beam. Since the light beam directed into the interferometer consists of two modal components each having an individual frequency and circular polarization, they are clearly distinguishable from one another by polarization techniques to provide two independent optical signals in the laser beam.

The first portion 21 of the laser beam 16 reflected by the beam splitter 10 along the fixed length optical path 11, passes through a second quarter waveplate 23, reflects from the mirror 12, and passes again through the quarter waveplate 23 to return to the beam splitter 10. Passing the first portion 21 of the beam 16 twice through the quarter waveplate 23 acts to rotate the polarization plane of each modal component 17 and 19 through an angle of 90° about the axis of the laser beam. For example, the first modal component 17 having frequency $f_1$ which was horizontally polarized upon entering the fixed optical path 11 as shown by bars referenced by numerical 18, returns to the beam splitter 10 with a vertical plane of polarization as shown by dots referenced by numerical 17'. Similarly, the second modal component having frequency $f_2$ which was vertically polarized upon entering the fixed length optical path 11 as shown by dots referenced by numerical 19 returns to the beam splitter 10 with a horizontal plane of polarization, as shown by bars referenced by numerical 19'.

The second portion 25 of the laser beam 16 which passes through the beam splitter 10 and along optical path 13, is reflected from the moving mirror 14 and directed back along path 13 without change in polarization. Each of the modal components of the second portion 25 of the laser beam may, however, be changed in frequency by a value $\Delta f_d$ which is caused by a Doppler effect produced by movement of the movable mirror 14. Thus the modal component having frequency $f_1$ changes in frequency to $f_1 \pm \Delta f_d$, and the component having frequency $f_2$ changes in frequency to $f_2 \pm \Delta f_d$.

Since only unidirectionally polarized light waves can combine through the beam splitter 10, the modal component 17 of the laser beam having frequency $f_1$ which has traversed the first optical path 11 and which has been rotated in plane of polarization by 90°, will recombine with the modal component 19 of the laser beam which has traversed the second optical path 13 having frequency $f_2 \pm \Delta f$ due to their identical planes of polarization. A first recombined component of the laser beam in one polarization plane as identified by numerical 27 will thus exhibit a frequency of $f_1 - (f_2 \pm \Delta f_d)$. A second recombined component of the laser beam in the perpendicular polarization plane as identified by numerical 24 exhibits a frequency of $(f_1 \pm \Delta_d) - f_2$. The recombined laser beam components 27 and 29 having orthogonal planes of polarization are then directed from the interferometer through a polarizer 31 which filters, i.e. removes one of the two polarized modal components. Thus, the detector 44 will receive a laser beam having uniplanar polarization and having an intensity modulation which is determined by the combination of the differing frequency modal components of the laser beam which have traversed different optical paths, respectively, where one may have a Doppler shift in frequency $\Delta f_d$ introduced.

It should be noted that a Doppler shift in frequency $\Delta f_d$ is introduced to the frequency of each of the modal components of the second portion of the laser beam only when the movable mirror 14 is moving. Thus, when the mirror 14 is stationary the first modal component having frequency $f_1$ traversing the first optical path 11 will recombine at the beam splitter 10 with the second model component having the same polarization and frequncy $f_2$ after traversing the second optical path 13, to yield a heterodyne frequency laser beam which exhibits a modulation, or beat signal having a frequency equal to the difference between the component frequencies, i.e., $f_1-f_2$. If frequency $f_1$ equals $f_2$ as in prior art systems, there is no beat signal generated. Where frequency $f_1$ differs from frequency $f_2$, as with the Zeeman-split modal components used in the present invention, a continuous beat signal is generated which is continuous and whose beat frequency is equal to the difference in frequency between the modal components and is modulated by Doppler shift in frequency of one component.

Thus, the detector 44 will receive a laser beam having a continuous and measurable beat signal which indicates the difference in frequency between the modal components. When the beat frequency equals $f_1-f_2$, it can be determined that the mirror is stationary. Due to the continual intensity modulation or beat signal exhibited by the exiting laser beam 30, even when the movable mirror 14 is stationary, an information signal can be continually produced which permits velocity control and position measurement of the mirror 14 throughout the range of its scan.

Control of the mirror scan velocity and duration is accomplished by monitoring the increase or decrease in the beat signal frequency of the exiting light beam 30 from the mirror standstill frequency $f_1-f_2$. A difference in frequency from the standstill beat signal frequency, i.e. the frequency difference $f_1-f_2$ exhibited by heterodyning the model components when the mirror is stationary is indicative of mirror velocity. By determining whether the beat signal frequency is increased or decreased from the frequency $(f_1-f_2)$ displayed at mirror standstill, the velocity of mirror scan and the direction of mirror travel is indicated. When the movable mirror 14 is moving at a constant velocity scan, the Doppler shift $\Delta f_d$ introduced to the beat signal frequency will be constant. It is the beat signal frequency which the present mirror scan servo control uses to control mirror scan velocity.

The magnetically influenced laser 18 is stabilized to provide a constant separation between the modal component frequencies, i.e., $f_1$ and $f_2$. This maintains a constant frequency beat signal (intensity change) in the laser beam 16. The stabilized beat signal frequency increases the accuracy of analysis of the mirror velocity and position. An exactly predictable beat signal frequency permits accurate measurement of a Doppler shift in frequency $\Delta f_d$ to determine whether a constant velocity scan of the movable mirror 14 is being controlled.

Referring to FIG. 1, a basic element of the mirror scan control system is a reference frequency synthesizer 54. The frequency synthesizer 54 generates a reference signal 56, which is applied to a laser servo control 58 to stabilize the difference in frequencies between the modal components of laser beam 16. The stabilized difference in frequency between modal components of the laser beam 16 provides a constant stabilized intensity modulation or beat signal in the laser beam when the modal components of beam 16 are heterodyned. This beat signal frequency is used as a measurement tool for determining the velocity and position of the movable mirror 14 at any point throughout a scan, as discussed.

The reference signal 56 may also be applied to a dedicated computer (not shown) as a reference indicative of the laser beam intensity modulation and beat signal frequency to be used for data analysis.

The frequency synthesizer 54 also generates a second reference signal 60 which exhibits the frequency equal to the first reference signal 56 with a selected upward or downward frequency shift $\Delta R$. The upward or downward direction of frequency shift is determined by a forward/reverse input signal 62 applied to the frequency synthesizer 54 by a directional control 64. The magnitude of the frequency shift $\Delta R$ is determined by a scan speed input signal 66 which is programmable. The second reference signal 60 is applied to the mirror scan control 50 to provide a reference for control of the scan velocity of the movable mirror 14 and to synchronize performance of the other elements of the mirror scan control system.

The reference frequency synthesizer 54 comprises digital electronic circuitry generally known in the electronic arts for generating shifted and variable frequency signals. For example, the frequency synthesizer 54 may include a crystal oscillator which generates a frequency stabilized signal having a uniform periodic waveform. The output signal of the crystal oscillator may be varied in frequency, for example, by a divider or multiplier circuit to provide reference signal 56 or 60 which are used to stabilize the laser beam.

The frequency of the reference signal 56 may be selected within a range of frequencies. The range is determined by the differences in frequency that may be exhibited between the modal components of laser beam 16 through adjustment to laser operating parameters. For a magnetically influenced He-Ne laser the range is generally 100 to 1500 KHz. It is preferable to select a frequency at a lower portion of this range to provide a more useful signal adapted for use with currently available digital electronic components. For example, the reference signal 56 is preferably controlled at a frequency of 250 KHz. This may be obtained by selecting a crystal oscillator of the correct frequency or by using a number of known frequency generators, such as one having a multiplier/divider circuit applied to a higher frequency crystal oscillator output.

The 250 KHz frequency selected for reference signal 56 determines the exact frequency difference, $f_1-f_2$, desired between the modal components of the laser beam 16 when the laser 18 is stabilized. This permits use of a phase-lock control loop to stabilize the frequency difference which results in a stable intensity modulation, or beat signal frequency equal to the 250 KHz frequency of the reference signal, when the modal components are heterodyned. This stable 250 KHz beat signal frequency is easily measurable in the heterodyned laser beam by known electronic detectors. It provides a useful information signal which can be used to determine the velocity and position of the movable mirror 14, and thus to reference interferogram data.

The frequency of the second reference signal 60 is determined by the selected frequency of the first reference signal 56. The reference signal 60 is thus based upon the 250 KHz frequency of the first reference signal and is shifted in frequency upwardly or downwardly by a selected value equal to ΔR. The absolute value of the frequency shift ΔR is programmable into the frequency synthesizer 54. Various circuits and techniques for obtaining a selected frequency shift in a signal are well known to those skilled in the art pertaining to frequency synthesizers.

The second reference signal 60 is preferably shifted in frequency by 5 KHz, upwardly or downwardly, to provide a 245 KHz signal or a 255 KHz signal as determined by the directional control 64. The change in frequency ΔR which is added to or subtracted from the 250 KHz base frequency will instruct the mirror scan control 50 to accurately determine the scan velocity of the movable mirror 14 throughout the scan range. The selected 5 KHz frequency shift is utilized to drive the movable mirror 14 at a constant velocity of approximately 0.3 centimeters per second throughout the mirror scan, in either forward or backward direction as determined by an upward or downward frequency shift.

The directional control 64 can comprise an up/down counter array responsive to the number of phase shifts between the intensity modulation (beat signal) generated in the laser beam (controlled to 250 KHz) and the frequency of the intensity modulation beat signal detected in the heterodyned laser beam emerging from the interferometer (250 KHz±Doppler shift in frequency). By maintaining a count of the number of phase shifts occurring between these signals, the distance that the movable mirror 14 has traversed in a scan can be determined. For example, the up-down counter array may have an up-count input responsive to the signal 68 to generate an increasing count for each cycle of intensity modulation in the entering laser beam 16 and a down-count input responsive to the signal 74 to generate a decreasing count for each cycle of the intensity modulation of the emerging laser beam 30. Consequently, the up-down counter array counts the number of phase shifts occurring between the beat signal and the beat signal affected by Doppler phenomenon due to scan of the movable mirror. The number of phase shifts is compared by a comparator to a programmed value equal to the known number of phase shifts which occur during the length of a total scan. A typical scan range of 2 centimeters exhibits approximately $6.3 \times 10^4$ shifts in phase as the movable mirror 14 moves through a scan, for the magnetically influenced He Ne laser described having its modal components controlled to a 250 KHz difference in frequency. By determining the number of phase shifts caused by movement for the mirror within the known scan range i.e. total number of phase shifts possible, the directional control determines the position of the mirror 14 within the scan range and when each end of the scan is reached. This is accomplished by comparing the number of phase shifts counted with the number programmed in the comparator. When the mirror 14 has reached the selected position at the end of a scan, i.e., a selected number of phase shifts, the directional control 64 produces a forward/reverse signal 62 which is supplied to the reference frequency synthesizer 54. The direction control 64 instructs the synthesizer to change the frequency shift ΔR of the second reference signal 60 from an increasing value to a decreasing value or from the decreasing value to an increasing value whichever is opposing. This change of the frequency of the second reference signal 60 instructs the mirror scan control 50 to change the scan direction of the movable mirror 14.

The design of the directional control, i.e. the up/down counter array, which maintains an accurate count of phase shifts is generally known. The up/down counter array is a standard digital technique and may be constructed with Motorola CMOS 4029 counters as described in the related Motorola data sheets.

A signal 68 having the beat signal characterizing the laser beam, is obtained for input to the directional control 64 from the output of a photodetector 70 receiving a rearwardly directed portion 72 of the laser beam. Signal 68 is the same input signal obtained from the laser for the laser servo control 58, which is described in copending application of Hersher and Wyntes entitled Laser Stabilization Control Means, and can be obtained in the manner described therein. A signal 74 having a characteristic frequency of the heterodyned modal components of the laser beam 30 is obtained from detector 44 which detects the intensity changes in the heterodyned laser beam 30 leaving an interferometer.

The laser stabilization control 58 stabilizes the difference in frequency ($f_1 - f_2$) between the differing frequency modal components of the laser beam 16. The laser servo control 58 accomplishes stabilization by a phase-lock electronic control loop technique using the signal 76 having the beat signal characterizing the laser beam obtained by detecting laser beam 72 and the first reference signal 56 supplied by the reference frequency synthesizer 54. The phase lock control loop is closed by supplying a correction signal to frequency adjusting elements of the laser 18, which accurately control the difference in frequency exhibited by the modal components of the laser beam 16 and 72 and thus the beat signal frequency. By applying phase-lock control to the laser utilizing the stable 250 KHz reference signal 56, the beat signal frequency found in the laser beam is stabilized 250 KHz. Since the beat signal frequency is equal to the difference in frequency between the modal components heterodyned to obtain it, the frequency difference between modal components of the laser beam is also stabilized at 250 KHz. The circuit and operation of the laser servo control 58 is described in copending patent application for A Laser Stabilization Control Means, invented by Wyntjes and Hersher, and filed on Mar. 5, 1983, Ser. No. 472,538.

Thus, the beat signal frequency of the laser beam 16 entering the interferometer is stabilized at a known value of 250 KHz. Therefore, the beam 30 exiting the interferometer will also exhibit the known beat signal frequency of 250 KHz when the movable mirror 14 is stationary, i.e. no Doppler shift in frequency is introduced. The accurate control of the beat signal frequency exhibited by the laser beam traversing the interferometer, provides a highly accurate measuring tool for indicating the position of the movable mirror 14 and for control velocity of mirror scan. It is of great advantage that the beat signal in the laser beam is present in continuously, independent of mirror movement, to provide for continual management of the movable mirror 14 even when the mirror is stationary.

A measurement of the number of phase shifts occurring between the beat signal of the heterodyned beam leaving the interferometer and the beat signal exhibited by the laser beam entering the interferometer provides accurate means of determination of mirror displacement along the mirror scan range. This can be accomplished by standard digital counting techniques, as described and used in the directional control 64. A measurement of the difference in frequency between the beat signal frequency exhibited by the heterodyned beam leaving the interferometer and the beat signal frequency exhibited by the laser beam entering the interferometer, provides accurate indication of velocity of the scanning mirror. By using the frequency difference detected, scan velocity of the mirror can be maintained constant. These measurements thus provide accurate mirror position and velocity control.

Figure 3:
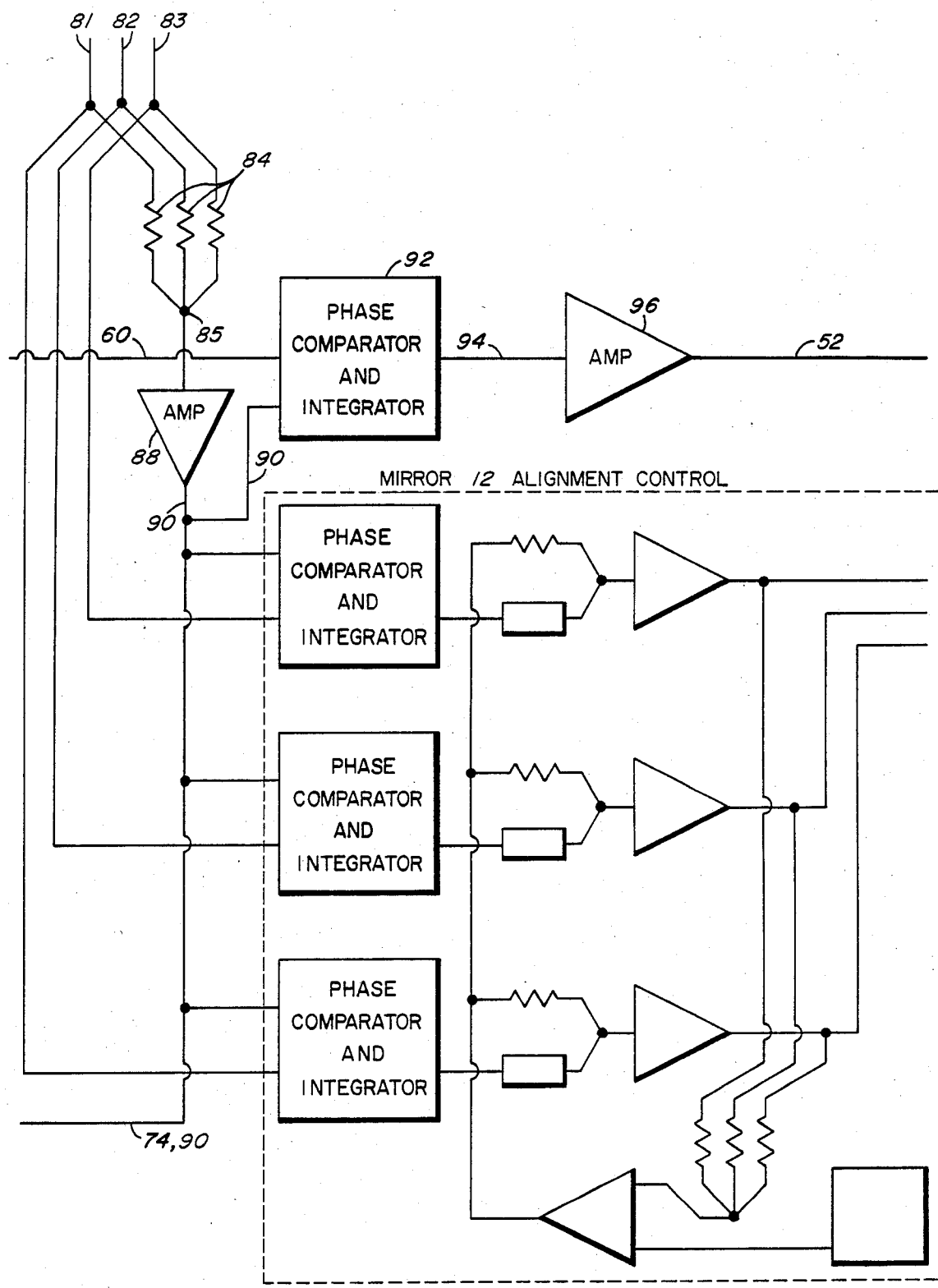
FIG. 3 is a schematic of the electrical circuit of a preferred embodiment of the Mirror Scan Control.

The mirror scan control 50 comprising an electronic phase-lock control loop supplies a scan drive signal 52 for controlling the movement of the movable mirror 14. The electrical circuit of the mirror scan control is shown in FIG. 3. Referring to FIG. 3, the mirror scan control 50 receives three signals 80, 81 and 82 produced by the detector 44 (shown in FIG. 1) in response to intensity variations exhibited in the laser beam 30 which the detector 44 receives. The signals 80, 81 and 82 provide information of the frequency and phase of the heterodyned laser beam 30 exiting the interferometer. The signals 80, 81 and 82 are electrical signals whose voltage oscillates with a frequency equal to the intensity variation of that portion of the heterodyne beam 30 cross-section to which they are responsive. Although these three signals have the same amplitudes and frequencies, generally they may differ in phase in response to phase differences occurring across the cross section of the beam 30 due to slight differences in the path length across beam width over which the laser beam passes.

The signals 80, 81 and 82 are passed through resistors 84 and summed at summing node 85. The summational signal from node 85 is applied to an operational amplifier 88 which produces a signal proportional to the average phase of the three signals 80–82. This signal shall be termed the average phase signal 90 and is the same as the signal 74. The average phase signal 90 possesses a phase equal to the average of the three phases of the individual signals 80–82.

The average phase signal is applied to a phase comparator (and integrator) 92. The phase comparator 92 also receives the second reference signal 60 produced by the reference frequency synthesizer 54. The phase comparator 92 compares the phases of the signals 90 and 60 and produces an output signal (PC output signal) which is proportional to the difference in phase between signals 90 and 60. The phase detector 92 is a commercially available device manufactured by Motorola, Inc. and available as Part No. MC14046B. Further information regarding the phase detector may be obtained from the Motorola CMOS Data Book on pages 7-124.

The output signal of the phase comparator 92 is a voltage signal having a voltage level proportional to the difference in phase between the average phase signal 90, characteristic of the average intensity modulation of the heterodyne laser beam 30 exiting the interferometer, and the reference signal 60 having a frequency characteristic of laser beam intensity variation when the mirror 14 is scanned at the desired velocity. Since the intensity modulation in the heterodyne beam 30 includes a frequency difference $\Delta f_d$ caused by the Doppler shift in frequency related to mirror movement, and the beat frequency of the beam 30 without the Doppler shift $\Delta f$ is known to be stabilized at 250 KHz, the comparison of the phase signal 90 obtained from beam 30, with the reference signal 60 having a frequency selected to include the Doppler-shift in frequency at the scan velocity desired (i.e. 250 KHz$\pm\Delta f$), yields a clear indication of the correction required to instantaneous scanning velocity of the mirror to obtain the desired constant velocity. This correction is indicated by the PC output signal. By bringing the signals 90 and 60 into a phase-locked relationship, the PC output signal is stabilized at a value causing no further correction to the velocity at which the movable mirror 14 is being driven.

The PC output signal of phase comparator 92 is supplied to an integrator circuit shown as incorporated in phase comparator 92) to obtain a control signal 94 having a voltage proportional to the time integral of the phase difference between the signals 90 and 60, i.e., of the voltage changes in the PC output signal. The voltage level of control signal 94 is proportional to the time integral of the position error of mirror 14 from an ideal scan at constant velocity. Mirror position error is corrected by increasing or decreasing the voltage of the the control signal 94, as determined by an increase or decrease of the voltage of the PC output signal generated by phase comparator 92 in response to phase error between the compared signals 60 and 90. The voltage control signal 94 will be adjusted in increasing or decreasing increments corresponding to greater and lesser phase difference between the signals 60 and 90, to correct mirror scan velocity to approach constant velocity.

The integrator circuit may be comprised, for example, of a low pass filter network selected to match the frequency response characteristics of the other elements in the servo loop, as known in standard phase lock loop technology. Further information on integrator circuit designs applicable to this invention is discussed in the Motorola CMOS Data Book, previously cited.

The control signal 94 is applied to operational amplifier 96 in addition to a source of power supply. Control signal 94 directs operational amplifier 96 to proportionally increase or decrease the voltage level of scan drive signal 52 which it generates and which is applied to the linear motor 28 driving the movable mirror 14. An increase in voltage of drive signal 52 increases mirror scan velocity, while a decrease in voltage of signal 52 decreases mirror scan velocity. The operational amplifier is ground referenced to obtain single-end mode of operation as described in many reference materials, for example Analog and Digital Electronics written by Vassos and Ewing, and published by John Wiley and Sons, N.Y., N.Y.

When the interferometer is in operation and the mirror 14 is scanned, the mirror scan control continually compares the phase relationship between the intensity modulation of heterodyned laser beam 30 as provided by signal 90 and the reference signal 60. The control signal 94 generated will be incrementally adjusted to drive the operational amplifier 96 to incrementally adjust the scan drive signal 52 to drive the movable mirror 14 at a scan velocity which will bring the average phase signal 90 into phase with the reference signal 60. Scan velocity of the movable mirror 14 is adjusted until a phase-lock is obtained between average phase signal 90 and reference signal 60. When a lock in phase is obtained between the reference signal 60 and the average phase signal 90, the control signal 94 will stabilize, as will the scan drive signal 52 which it directs, to provide a constant voltage drive signal 52 to the linear motor 28. The constant voltage signal determines a constant velocity scan of the moving mirror 14 at the selected scan velocity. Any deviation from a constant velocity scan is immediately corrected since the phase-lock relationship will be broken, and the mirror scan servo control acts to immediately correct drive signal 57 to bring the average phase signal 90 indicating mirror velocity back into a phase-locked relationship with the constant frequency reference signal 60.

The selected scan velocity can be easily changed by programming the reference frequency synthesizer 54 to generate a reference signal 60 having a different frequency value (250 KHz±frequency shift ΔR). The different frequency reference signal 60 will be phase locked to the detected intensity modulation of the heterodyned laser beam 30 to drive the mirror 14 at a different scan velocity producing a Doppler shift in frequency equivalent to the frequency shift ΔR generated in the reference signal 60.

As the mirror 14 reaches the end of a scan, the direction control 64 instructs the reference signal synthesizer 54 to change the frequency shift ΔR in the reference signal 60 from an increase to a decrease value relative to the base 250 KHz frequency, or vice versa. The change in sign of the reference signal frequency shift ΔR requires the Doppler shift in frequency produced by the moving mirror 14 to change in sign, i.e., from a +5 KHz to a −5 KHz. This requires the mirror to scan in the opposing direction. Phase comparison in the mirror scan servo control 50 will produce a scan drive signal 52 which instructs the linear motor 28 to scan the movable mirror 14 in the opposing direction. Bidirectional scan velocity control is thus accomplished.

Since the reference signal 60 is continuously provided and the beat signal frequency measurable in the heterodyned beam 30 is continuously displayed, scan velocity and position control of the movable mirror 14 are maintained throughout directional change of mirror scan. This affords greater assurance of accuracy and reduces the number of scans required since the usable portion of each scan of the mirror 14 during which control is maintained, is increased.

The mirror scan control for an IR spectrophotometer described herein is a preferred embodiment as of the filing date of this patent. Alternative means and apparatus may be utilized by those skilled in the arts of electronics and scientific instrument design to construct the invention which is claimed as follows. The description provided herein should not be considered to limit this invention within the scope of the following claims.

What is claimed is:

1. A closed loop servo control for controlling the movement of a movable mirror in an interferometer used for spectroscopic measurement, comprising:
    first means for producing a heterodyne laser beam through interaction of a laser beam with said movable mirror, having a continuous modulation with a frequency from which movement of said movable mirror may be determined;
    second means for producing a reference signal having a frequency characteristic of a desired modulation frequency of said heterodyne laser beam indicating movement of said movable mirror;
    third means receiving said heterodyne laser beam produced by said first means, for detecting said modulation frequency of said laser beam to produce an operational signal characteristic of said modulation frequency;
    fourth means receiving said reference signal from said second means and said operational signal from said third means, for comparing the phaser between said reference signal and said operational signal and producing an error signal responsive to the difference in phase between said signals with respect to time; and
    control means responsive to said error signal for controlling movement of said movable mirror
    whereby movement of said movable mirror is controlled, to obtain a heterodyne laser beam having a modulation with a frequency which, when detected by said third means, produces an operational signal which is locked in phase with said reference signal to determine movement of said movable mirror.

2. The servo control of claim 1, wherein said first means includes a laser influenced by a magnetic field to obtain a laser beam having a plurality of component modes of differing frequency, whihc component modes heterodyne to produce a heterodyned laser beam having a continual modulation.

3. The servo control of claim 2, wherein said first means additionally comprises means for mixing one component mode of said laser beam having a first frequency with a another component mode of said laser beam having a second frequency to produce a continual modulation with a detectable frequency in said heterodyned laser beam.

4. The servo control of claim 2, wherein said first means additionally comprises means for mixing one component mode of said laser beam having a first frequency with another component mode of said laser beam having a second frequency to produce an amplitude modulation with a detectable frequency in said heterodyne laser beam.

5. The servo control of claim 1, wherein said third means comprises at least one photodetector responsive to the modulation frequency of said laser beam.

6. The servo control of claim 1, wherein said second means comprises a crystal oscillator which generates a stable output signal of a known frequency, and means for electrically processing said output signal from said crystal oscillator to obtain a base signal having a selected frequency characteristic of the modulation of said laserbeam when said movable mirror is stationary, and means for shifting the frequency of said base signal by a selected value in an upward or downward manner to obtain said reference signal.

7. The servo control of claim 1, wherein said fourth means comprises a phase detector and an integrator, which generates an error signal proportional to the integral of the differences in phase between said reference signal from said second means and said operational signal from said third means.

8. The servo control of claim 1, wherein said control means responsive to said error signal comprises an operational amplifier responsive to said error signal for producing a movement signal, and a drive means for driving said movable mirror responsive to said movement signal.

9. The servo control of claim 1, wherein said third means for detecting said modulation frequency comprises a photodetector array for measuring the intensity variance of said laser beam at different portions of its cross section, and means for averaging a plurality of signals obtained from said photodetectors to produce said operational signal.

10. A closed loop servo control for controlling the movement of a movable mirror in an interferometer used for spectroscopic measurement of a sample material comprising:
first means for producing a heterodyne laser beam through interaction of a laser beam with said movable mirror, having a continuous amplitude modulation with a frequency from which the rate of movement of the movable mirror may be determined;
second means for producing a reference signal having a frequency characteristic of a desired modulation frequency of said heterodyne laser beam indicating a constant rate of movement of said movable mirror;
third means receiving said heterodyne laser beam produced by said first means, for detecting said modulation frequency of said laser beam to obtain an operational signal characteristic of said modulation frequency;
output means receiving said reference signal from said second means and said operational signal from said third means and responsive to the difference in frequency between said signals for producing an output signal proportional to said difference; and
drive means for driving the movable mirror, responsive to said output signal to increase or decrease the rate at which said movable mirror is moved.

11. A closed loop servo control for controlling the movement of a movable mirror in an interferometer used for spectroscopic measurement of a sample material comprising:
first means for producing a heterodyne laser beam through interaction of a laser beam with said movable mirror, having a continuous amplitude modulation with a frequency from which the rate of movement of the movable mirror may be determined;
second means for producing a reference signal having a frequency characteristic of a desired modulation frequency of said heterodyne laser beam indicating a constant rate of movement of said movable mirror;
third means responsive to said first means, for detecting said modulaton frequency of said laser beam to obtain an operational signal characteristic of said modulation frequency;
output means receiving said reference signal from said second means and said operational signal from said third means and responsive to the difference in phase between said signals for producing an output signal proportional to said difference; and
drive means for driving the movable mirror responsive to said output signal to increase or decrease the rate at which said movable mirror is moved.

12. A mirror scan servo control for bidirectionally driving a movable mirror of an interferometer used for spectroscopic measurement, at constant velocity scan comprising:
means for generating a laser beam having a characteristic modulation frequency and directing said beam through said interferometer to receive a change in modulation frequency in response to a doppler effect generated by movement of the movable mirror and exiting said beam from said interferometer with a modulation frequency characteristic of the rate of scan of said movable mirror;
a reference clock producing a pair of constant frequency reference signals, a fast signal having a frequency greater than said modulation frequency and a second signal having a frequency less than said modulation frequency;
means for detecting said laser beam to produce an electrical signal having a frequency proportional to the modulation frequency displayed by said laser beam;
a phase detector receiving said reference signal and said electrical signal, the detector producing an output signal having a voltage proportional to the phase difference between said reference signal and said electrical signal, an integrator receiving said phase detector output signal, for summing said output signal of said phase detector and producing a drive signal proportional to the integrated phase difference of said reference signal and said electrical signal; and
drive means for bidirectionally driving said movable mirror responsive to said drive signal, said drive means responding to said drive signal to drive said mirror at a velocity which generates a frequency change in said laser beam as generated by the doppler effect of the moving mirror, to bring the phase of the modulation frequency into phase with the phase of said reference signal.

13. The closed loop servo control of claim 1 wherein said reference frequency produced by said second means is equal to a desired modulation frequency of said heterodyne laser beam, which indicates a constant rate of movement of said movable mirror.

14. A closed loop servo control for controlling the movement of a movable mirror in an interferometer used for spectroscopic measurement, comprising:
first means for producing a heterodyne laser beam through interaction of a laser beam with said movable mirror, having a continuous modulation with a frequency from which movement of said movable mirror may be determined;
second means for producing a reference signal having a frequency characteristic of a desired modulation frequency of said heterodyne laser beam indicating a constant rate of movement of said movable mirror;
third means receiving said heterodyne laser beam produced by said first mirror, for detecting said modulation frequency of said laser beam to produce an operational signal characteristic of said modulation frequency;
fourth means receiving said reference signal from said seocnd means and said operational signal from said third mean, for comparing the phase between said reference signal and said operational signal and for producing an error signal responsive to the difference in frequency between said signal with respect to time; and
control means responsive to said error signal for controlling the rate of movement of said movable mirror, and for incrementally adjusting said rate to obtain a phase lock between said operational signal characteristic of said modulation frequency of said heterodyne laser beam and said reference signal, whereby movement of said mirror may be controlled.

15. The servo control of claim 1 wherein said second means is responsive to a direction signal to produce an increase or decrease in frequency of said reference signal and additionally comprising means for determining the position of said movable mirror within a range of movement, and means for producing a direction signal.

16. The servo control of claim 15 wherein said second means additionally comprises means for changing the frequency of said reference signal, to increase or decrease said reference signal frequency relative to said continuous modulation frequency of said heterodyne laser beam to obtain directional control of said movable mirror.

* * * * *